Inventor:
Salvatore Soscia.
by Allard A. Braddock
His Attorney

Inventor:
Salvatore Soscia.
by Allard A. Braddock
His Attorney

United States Patent Office 3,118,039
Patented Jan. 14, 1964

3,118,039
PLUG-IN REMOTE CONTROL RELAY
Salvatore Soscia, Cranston, R.I., assignor to General Electric Company, a corporation of New York
Filed Mar. 6, 1962, Ser. No. 177,845
3 Claims. (Cl. 200—168)

This invention relates to a remote control wiring system relay; more particularly, the invention relates to a remote control relay which can be quickly and easily installed or replaced.

Von Hoorn application Serial No. 177,850, filed of even date with the present application, discloses and claims a remote control wiring system relay center designed particularly for relay accessibility and substitution. Among other features, the von Hoorn application discloses the use of parallel bus bars on the high-voltage side of a relay mounting bracket to accommodate relay terminals having a structure to be mounted on the bus bars.

An object of the present invention is to provide a relay adapted for plug-in contact with bus bars positioned on a relay mounting bracket.

Another object of the invention is to provide a remote control relay in which wiring connections are reduced to a minimum and arranged for easy attachment.

Another object of the invention is to provide a plug-in remote control relay which may be safely and quickly substituted for a relay which has become defective during service.

The above and other objects are accomplished in accordance with the following specification considered in conjunction with the annexed drawings wherein FIG. 1 is a broken perspective view of a relay mounting bracket with a relay mounted thereon;

Briefly stated, in accordance with one of its aspects, the remote control relay of the present invention has a double-contact high-voltage terminal structure comprising a first terminal having an interior end and a forked exterior end adapted for clamping contact on a bus bar, a spring locking tongue positioned to press a conductor against the interior end of the first terminal, a second terminal having an interior end and a forked exterior end and likewise adapted for clamping contact on a bus bar, a conductor bar, an internal circuit electrically connecting the interior end of the second terminal across the contacts of the remote control relay to the conductor bar, and a spring locking tongue positioned to press a conductor against the conductor bar.

Figure 1:
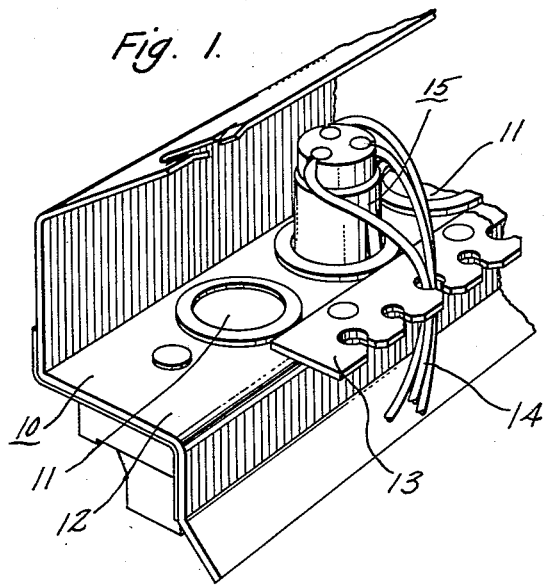

Referring to the drawings, a relay mounting bracket 10 composed of sheet metal has a plurality of knockouts 11 positioned in spaced relation along an intermediate section 12. Section 12 of the relay is slanted with respect to the cover and back of a conventional sheet metal box (not shown) in which the bracket 10 is mounted. As shown in FIG. 1, a wire guide 13 may be mounted on section 12 to serve as a guide for the low-voltage control wires 14 of a relay 15.

Figure 2:
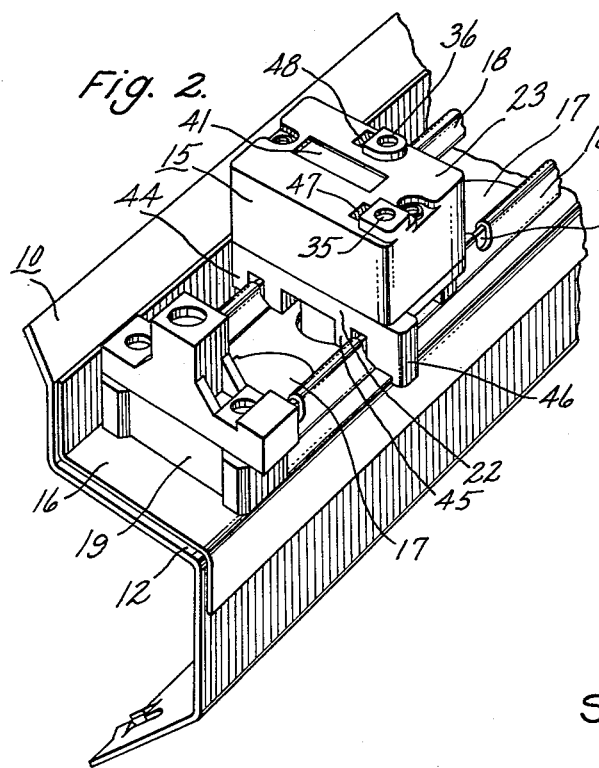
FIG. 2 is a broken perspective view of the bracket of FIG. 1 as viewed from the high-voltage side.

The bracket 10 has an insulating liner 16 composed of fibrous material on the high-voltage side as best shown in FIG. 2. This liner includes knockouts 17 which are in alignment with holes 11 in the metal bracket 10. Also mounted on the high-voltage side of the bracket 10 are a pair of parallel bus bars 18 maintained in position by mounting posts 19. For safety reasons, the bus bars 18 are insulated but the insulation is exposed at spaced intervals as indicated at 21 in order to enable contact to be made between the bus bars and the terminals of the relay 15.

Figure 3:
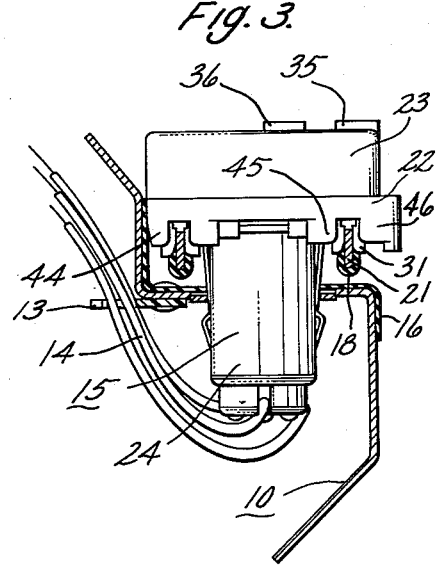
FIG. 3 is a partial sectional view of a bracket illustrating the relay mounting means of the present invention.
Figure 5:
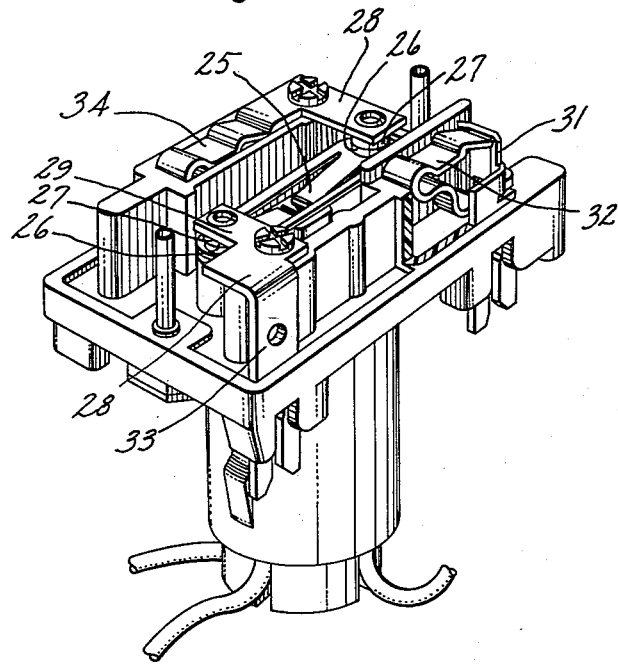
FIG. 5 is a perspective view of the relay base portion with the cover removed showing the high-voltage circuit arrangement.

Referring particularly to FIGS. 3 and 5, the relay 15 is composed of a base 22 and cover 23 composed of a molded plastic material such as a conventional phenolic. Mounted on the base 22 is a barrel 24 which contains electromagnetic coils and a plunger movable upon energization of the coils by means of low-voltage signals through the control leads 14. FIG. 5 shows a relay armature 25, an element which is conventional for remote control relays. Mounted upon the extremities of the armature 25 are movable contacts 26 which open and close contact according to actuation of the relay coils with stationary contacts 27 one of which is mounted on a contact bar 28 and the other of which is mounted on a terminal bar 29.

The relay terminals consist of a first terminal 31 having a forked end extending exteriorly in the same direction as the relay barrel 24 through an aperture in the base 22. The forked end is adapted for clamping engagement with one of the bus bars 18. The first terminal 31 extends a short distance on the interior side of the base 22 where a spring locking tongue 32 is positioned to press a conductor against the terminal. A second terminal 33 has a forked end extending exteriorly of the base 22 and spaced from the first terminal 31 a distance equal to the distance between the bus bars 18. As in the case of the first terminal 31, the forked end functions to exert clamping pressure on one of the bus bars 18. On the interior side of the base 29 the second terminal 33 is integral with the terminal bar 29. Thus, it may be seen that when the movable contacts 26 close the circuit with the stationary contacts 27 an electrical circuit is completed from the second terminal 33 through the armature 25 to the contact bar 28. A spring locking tongue 34 is positioned to press a conductor against the contact bar 28.

The cover 23 includes a pair of apertures 35 and 36 which are aligned with the spring locking tongues 32 and 34, respectively, whereby conductors inserted through the apertures are locked by the locking tongues into contact with the first terminal 31 or the terminal bar 29 as the case may be.

Figure 4:
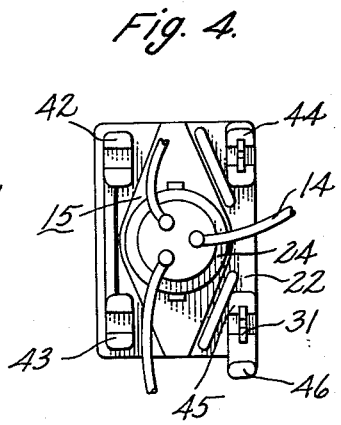
FIG. 4 is a plan view from the low-voltage side of a relay including the mounting means of this invention.

In order to install the relay of this invention, it is merely necessary to remove knockout 17 to expose an aperture in the bracket 10. The bracket 10 is normally positioned in a box so as to expose the high-voltage side as illustrated in FIG. 2. The low-voltage end of the relay 15 is then inserted through the aperture and the first and second terminals 31 and 33 are pressed into clamping engagement with the bus bars 18. The low-voltage control leads 14 are then run through the nearest notch on the wire guide 13 so as to be exposed for ready access and connection to the appropriate control circuit. Appropriate high-voltage power leads are then connected to the contact bar 28 and first terminal 31 by insertion through the apertures 35 and 36. These apertures are marked to show which is appropriate for connection of a high-potential lead and which for a ground lead. As shown in FIG. 2, the cover 23 of the relay 15 includes a central depression 41 in which a label identifying the circuit controlled by the relay may be positioned. In addition, the base of each relay is equipped with resting bosses 42, 43, 44, and 45 (FIG. 4) which serve to position the relay on the bus bars 18. An additional boss 46 (FIGS. 2–4) prevents the relay from being inserted in a position reversed to that shown in FIG. 2. To replace a relay, it is merely necessary to disconnect the control wires 14 and withdraw the relay from its mounting on the bus bars. This disconnects the high-voltage circuit and the power lines may be released from the relay by inserting a screwdriver through a release aperture 47 or 48 (FIG. 2) adjacent the apertures 35 and 36, respectively. Pressure on the screwdriver will release the spring locking tongues 32 and 34 and the conductors may then be withdrawn through the apertures 35 and 36. A new relay may be quickly connected to the system by reversing these steps.

While the invention has been described with reference to a particular embodiment, it is obvious that there may be variations which fall within the spirit of the invention. Therefore, the invention should be limited in scope only as may be necessitated by the scope of the appended claims.

What I claim as new and desire to secure by Letters Patent of the United States is:

1. In a remote control relay, a double-contact high-voltage terminal structure comprising a first terminal having an interior end and a forked exterior end adapted for clamping contact on a bus bar, a spring locking tongue positioned to press a conductor against the interior end of said first terminal, a second terminal having an interior end and a forked exterior end adapted for clamping contact on a bus bar, a conductor bar, an internal circuit electrically connecting the interior end of said second terminal across the contacts of the remote control relay to said conductor bar, and a spring locking tongue positioned to press a conductor against said conductor bar.

2. In a remote control relay, a base and cover member of molded plastic material constituting a high-voltage housing, a pair of stationary relay contacts each with a cooperating movable contact positioned in said housing, a first terminal having a forked end extending exteriorly of said housing through the base, said forked end serving to exert clamping pressure against a bus bar, a spring locking tongue positioned within said housing to press a conductor against an interior portion of said first terminal, a second terminal having a forked end extending exteriorly of said base, said forked end serving to exert clamping pressure against a bus bar, a conductor bar within said housing connected to an interior portion of said second terminal across the contacts of the relay, and a spring locking tongue within said housing positioned to press a conductor against said condudctor bar.

3. In a remote control relay, a base and cover member of molded plastic material constituting a high-voltage housing, said base member defining a pair of spaced apertures through which terminals extend, said cover member defining a pair of apertures for the insertion of conductors, a first terminal bar having a forked exterior end extending through one of said base apertures, a spring locking tongue positioned to press a conductor inserted through one of the apertures in the cover member against an interior portion of said first terminal bar, a second terminal bar having a forked exterior and extending through the other of said base apertures, a pair of stationary relay contacts each with a cooperating movable contact positioned in said housing, a conductor bar within said housing connected with an interior portion of said second terminal bar across the relay contacts, and a spring locking tongue within said housing positioned to press a conductor inserted through the other of said cover apertures against said conductor bar.

No references cited.

UNITED STATES PATENT OFFICE
CERTIFICATE OF CORRECTION

Patent No. 3,118,039                                      January 14, 1964

Salvatore Soscia

It is hereby certified that error appears in the above numbered patent requiring correction and that the said Letters Patent should read as corrected below.

Column 4, line 22, for "and" read -- end --.

Signed and sealed this 9th day of June 1964.

(SEAL)
Attest:

ERNEST W. SWIDER                                      EDWARD J. BRENNER
Attesting Officer                                           Commissioner of Patents